(No Model.)
R. R. COFFEY.
CHURN.
No. 267,496.
Patented Nov. 14, 1882.
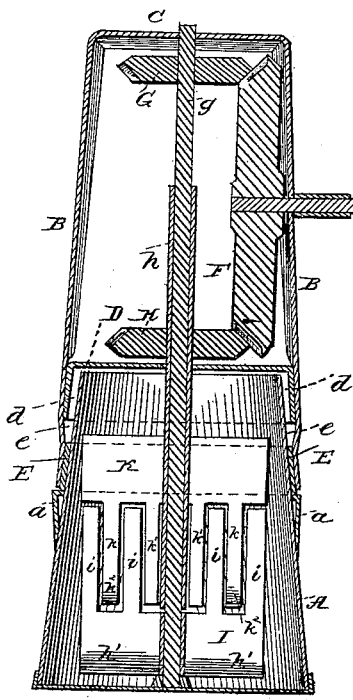
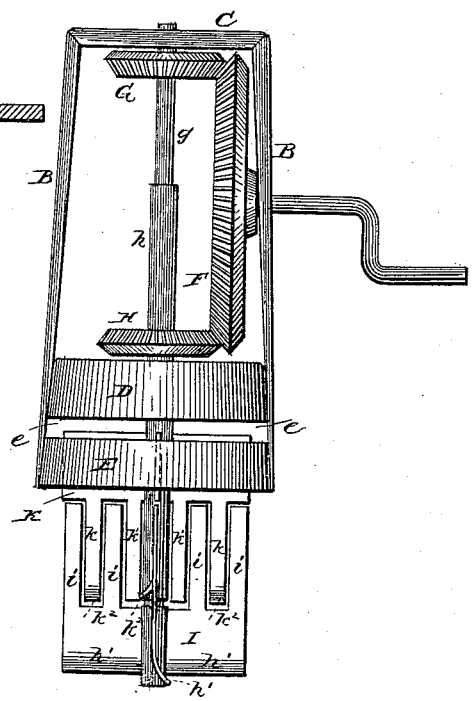
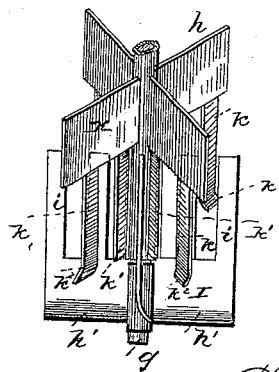
WITNESSES:
Fred. G. Dieterich
Jno. W. Stockett
Robert R. Coffey,
INVENTOR.
by Louis Bagger & Co,
ATTORNEYS.
N. PETERS, Photo-Lithographer, Washington, D. C.

UNITED STATES PATENT OFFICE.

ROBERT R. COFFEY, OF STURGEON, MISSOURI.

CHURN.

SPECIFICATION forming part of Letters Patent No. 267,496, dated November 14, 1882.

Application filed August 7, 1882. (No model.)

*To all whom it may concern:*

Be it known that I, ROBERT R. COFFEY, of Sturgeon, in the county of Boone and State of Missouri, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of my improved churn. Fig. 2 is a perspective view of the dasher-staff with its dashers. Fig. 3 is a side view of the frame which supports the dasher-staff, the dashers, and the gearing for operating it.

Similar letters of reference indicate corresponding parts in all the figures.

My invention has relation to churns with rotary dashers; and it consists in an improved construction of the churn-body or cream-receptacle and its cover, whereby I provide means for aerating the contents of the churn, substantially as hereinafter more fully described and claimed.

In the accompanying drawings, the letter A represents the churn-body, which may be of wood, stoneware, metal, or other material, made with a tapering or cone-shaped body, and having an outside hoop or shoulder, $a$, which forms a support for the frame that carries the dashers and their gearing. Said frame consists of two side pieces, B B, connected at the top by a cross-piece, C, and at their lower ends by a flanged cover, D, and below this by a collar, E, so that when the frame with its cover is superimposed upon the churn the collar E will rest upon the annular shoulder $a$ upon the outside of the churn, as clearly shown in Fig. 1 of the drawings.

The gearing for operating the dasher consists of a beveled wheel, F, which gears with pinions G and H, one of which is keyed upon a shaft, $g$, which passes through the tubular shaft $h$ of pinion H. At the lower end of shaft $g$ is secured the bottom dasher, I, which has vertical blades $i$, and is bent at the lower end of its four arms to form flaring wings $h'$. The top dasher, K, is of similar construction—that is, it consists of four blades crossing each other at right angles, and provided with downward depending blades $k$, which, in operating the dasher, work in the open spaces formed between the blades $i\ i$ of the lower dasher. The top dasher, K, is fastened upon the tubular shaft $h$, its innermost blades, $k'$, passing down along the tubular shaft to its bottom, and being soldered or otherwise firmly secured thereto at right angles to one another. The lower end of the central or inner shaft, $g$, forms a step or pinion, which works in a gudgeon in the center of the churn-bottom.

If desired, and to facilitate the operation of the churn, the lower ends of the depending blades $k$ of the upper rotary dasher, K, may be bent a little in a direction opposite to that of the flaring wings $h'$ of the lower rotary dasher, H, as shown at $k^2$, so as to more readily intercept and diverge the current of the cream thrown up from the bottom of the churn by the flaring wings $h'$.

By supporting the frame which carries the dashers and their gearing upon the annular ring or shoulder $a$ upon the outside of the churn-body instead of upon the cover, a small air-space (designated by $d$) is left between the cover and the body of the churn for the purpose of aerating the contents of the same, the air entering space $d$ through the annular slot or opening $e$, formed between the flanged cover D and the supporting-ring E.

My improved churn causes the butter to come rapidly, and as the dashers and other operating mechanism are secured upon the frame B B C, which in turn is supported upon the cover D and ring E, these may be readily removed from the churn-body when it is desired to remove the butter; nor do I require pipes or air-ducts for aerating the contents of the churn, which are objectionable, inasmuch as they are apt to be clogged up with the cheese or butter formed during the operation of churning.

Having thus described my invention, I claim and desire to secure by Letters Patent of the United States—

In a churn of the described class, the combination of a tapering churn-body or cream-receptacle, A, provided with an exterior annular flange or shoulder, *a*, and a flanged cover, D, connected to its supporting-ring E by the standards B B, carrying the operating mechanism, so as to leave an annular air-inlet, *e*, and air-space *d* between the top of the churn-body and its flanged cover, substantially as and for the purpose herein shown and described.

In testimony that I claim the foregoing as my own I have hereunto affixed my signature in presence of two witnesses.

ROBERT RICHARD COFFEY.

Witnesses:
FINIE E. MIDDLETON,
SAMUEL F. CROSS.